United States Patent
Timm et al.

(10) Patent No.: US 10,299,266 B2
(45) Date of Patent: May 21, 2019

(54) DELAY CALCULATION IN WIRELESS SYSTEMS

(71) Applicant: Honeywell International Inc., Morris Plains, NJ (US)

(72) Inventors: Steven L. Timm, Golden Valley, MN (US); Kelly P. Muldoon, Golden Valley, MN (US); Michael R. Franceschini, Centerport, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 108 days.

(21) Appl. No.: 15/464,284

(22) Filed: Mar. 20, 2017

(65) Prior Publication Data

US 2018/0270811 A1    Sep. 20, 2018

(51) Int. Cl.
*H04W 72/04* (2009.01)
*H04W 4/06* (2009.01)
*H04W 56/00* (2009.01)

(52) U.S. Cl.
CPC ......... *H04W 72/0446* (2013.01); *H04W 4/06* (2013.01); *H04W 56/0015* (2013.01)

(58) Field of Classification Search
None
See application file for complete search history.

(56) References Cited

U.S. PATENT DOCUMENTS

| | | |
|---|---|---|
| 3,742,498 A | 6/1973 | Dunn |
| 4,359,733 A | 11/1982 | O'Neill |

(Continued)

FOREIGN PATENT DOCUMENTS

| | | |
|---|---|---|
| EP | 0816866 | 1/1998 |
| EP | 1835668 | 9/2007 |

(Continued)

OTHER PUBLICATIONS

2nd Meeting CPG PTC, London, Apr. 16-19, 2013, "Subject: Proposed Updates to the Working Documents Towards a Preliminary Draft New Report M [WAIC Bands]", "Consideration of the Aeronautical mobile (route), aeronautical mobile, and aeronautical radionavigation services allocations to accommodate wireless avionics intra-commmunications (WAIC)", Date Issued: Apr. 8, 2013, pp. 1-20, Publisher: European Conference of Postal and Telecommuncations Administrations (CEPT), Source: Germany.

(Continued)

*Primary Examiner* — Diane L Lo
(74) *Attorney, Agent, or Firm* — Bookoff McAndrews, PLLC

(57) ABSTRACT

A wireless device network comprises: an unsynchronized wireless device in a time division multiple access based system; and a cognitive master in communication with the device, wherein the master processor is configured to: determine a number of time slots required for the master to transmit a message to and receive a response from the device, each time slot is a portion of a radio frequency spectrum over a frame period; when the number of time slots required are consecutively available, broadcast an announcement message indicating start of discovery of the unsynchronized device; wherein the device processor is configured to: generate a response message including a device ID; and broadcast the response message to the master; wherein the master processor is configured to: generate a correction factor based on at least one of a master transmit time and a master received time; and broadcast the correction factor to the device.

20 Claims, 4 Drawing Sheets

(56) References Cited

U.S. PATENT DOCUMENTS

| | | | |
|---|---|---|---|
| 4,427,981 | A | 1/1984 | Kyriakos |
| 5,428,603 | A | 6/1995 | Kivett |
| 5,574,979 | A | 11/1996 | West |
| 6,314,366 | B1 | 11/2001 | Farmakis et al. |
| 6,377,565 | B1 | 4/2002 | Puckette, IV |
| 6,801,951 | B1 | 10/2004 | Roden, III |
| 6,850,553 | B1 | 2/2005 | Waschka et al. |
| 6,941,110 | B2 | 9/2005 | Kloper et al. |
| 7,069,076 | B2 | 6/2006 | Hedberg et al. |
| 7,349,512 | B2 | 3/2008 | Rausch et al. |
| 7,440,427 | B1 | 10/2008 | Katz |
| 7,561,591 | B2 | 7/2009 | Hiraoka et al. |
| 7,634,275 | B2 | 12/2009 | Odman |
| 7,683,827 | B2 | 3/2010 | Kelly, Jr. et al. |
| 7,873,739 | B2 | 1/2011 | Hall et al. |
| 8,188,911 | B2 | 5/2012 | Beasley |
| 8,712,244 | B2 | 4/2014 | Hasegawa et al. |
| 8,908,573 | B1 | 12/2014 | Wang et al. |
| 9,065,645 | B2 | 6/2015 | Yang et al. |
| 2002/0072853 | A1 | 6/2002 | Sullivan |
| 2002/0141523 | A1* | 10/2002 | Litwin, Jr. ............ H04B 3/542 375/356 |
| 2003/0035173 | A1 | 2/2003 | Byers et al. |
| 2005/0090201 | A1 | 4/2005 | Lengies et al. |
| 2005/0179583 | A1 | 8/2005 | Jordan et al. |
| 2006/0109831 | A1 | 5/2006 | Tillotson |
| 2006/0114862 | A1 | 6/2006 | Hiraoka |
| 2006/0172705 | A1 | 8/2006 | Parthasarathy et al. |
| 2007/0268819 | A1 | 11/2007 | Johansson et al. |
| 2007/0268884 | A1 | 11/2007 | Kolavennu et al. |
| 2009/0083606 | A1 | 3/2009 | Choi et al. |
| 2009/0097468 | A1 | 4/2009 | Yi et al. |
| 2009/0116461 | A1 | 5/2009 | Yonge, III et al. |
| 2009/0174594 | A1 | 7/2009 | Thomas et al. |
| 2010/0085236 | A1 | 4/2010 | Franceschini et al. |
| 2010/0142590 | A1 | 6/2010 | Hohne et al. |
| 2011/0013526 | A1 | 1/2011 | Mosko |
| 2011/0199901 | A1* | 8/2011 | Kavanaugh ........... H04W 48/06 370/230.1 |
| 2012/0026941 | A1 | 2/2012 | Ahmad et al. |
| 2012/0188998 | A1 | 7/2012 | Philips et al. |
| 2013/0170505 | A1 | 7/2013 | Nemeth et al. |
| 2013/0230035 | A1 | 9/2013 | Grandhi et al. |
| 2014/0105194 | A1 | 4/2014 | Wiatrowski et al. |
| 2014/0254426 | A1 | 9/2014 | Abraham et al. |
| 2014/0348140 | A1 | 11/2014 | Atkinson |
| 2015/0003468 | A1 | 1/2015 | Thubert et al. |
| 2015/0078297 | A1 | 3/2015 | Zheng |
| 2015/0092642 | A1 | 4/2015 | Geboff et al. |
| 2015/0110004 | A1 | 4/2015 | Katz |
| 2015/0229133 | A1 | 8/2015 | Reynolds et al. |
| 2015/0365155 | A1 | 12/2015 | Subramanian et al. |
| 2015/0381706 | A1 | 12/2015 | Wohlert et al. |
| 2016/0029409 | A1 | 1/2016 | Mueller et al. |
| 2016/0211935 | A1 | 7/2016 | Fair et al. |
| 2016/0309404 | A1 | 10/2016 | Kasslin et al. |
| 2017/0171088 | A1 | 6/2017 | Shor et al. |
| 2017/0176588 | A1 | 6/2017 | Franceschini et al. |
| 2017/0180040 | A1 | 6/2017 | Wang et al. |
| 2017/0180072 | A1* | 6/2017 | Timm ................... G01S 13/34 |
| 2017/0181146 | A1 | 6/2017 | Franceschini et al. |
| 2017/0230916 | A1 | 8/2017 | Stein et al. |

FOREIGN PATENT DOCUMENTS

| | | |
|---|---|---|
| EP | 1930743 | 6/2008 |
| WO | 9605562 | 2/1996 |
| WO | 0199300 | 12/2001 |
| WO | 03001742 | 1/2003 |
| WO | 2014078811 | 5/2014 |
| WO | 2016054440 | 4/2016 |
| WO | 2016142837 | 9/2016 |

OTHER PUBLICATIONS

United States Patent and Trademark Office, "Notice of Allowance", "From U.S. Appl. No. 14/972,925", dated Sep. 5, 2017, pp. 1-31, Published in: US.

United States Patent and Trademark Office, "Office Action", "From U.S. Appl. No. 14/972,898", dated Jun. 16, 2017, pp. 1-67, Published in: US.

"4200-4400 MHz", Mar. 1, 2014, pp. 1-9, Publisher: National Telecommunications and Information Administration, Published in: US.

Mahmood et al., "Time Synchronization Accuracy in Real-Time Wireless Sensor Networks", "2009 IEEE 9th Malaysia International Conference on Communications", Dec. 15-17, 2009, pp. 652-657, Published in: Kuala Lumpur Malaysia.

European Patent Office, "Extended European Search Report for EP Application No. 16203907.7", "Foreign Counterpart to U.S. Appl. No. 14/972,925", dated Apr. 18, 2017, pp. 1-6, Published in: EP.

European Patent Office, "Extended European Search Report for EP Application No. 16199899.2", "Foreign counterpart to U.S. Appl. No. 14/972,880", dated May 10, 2017, pp. 1-9.

European Patent Office, "Extended European Search Report for EP Application No. 16199897.6", "Foreign Counterpart to U.S. Appl. No. 14/972,898", dated May 11, 2017, pp. 1-6, Published in: EP.

United States Patent and Trademark Office, "Advisory Action for U.S. Appl. No. 14/972,898", dated Dec. 21, 2017, pp. 1-6, Published in: U.S.

Franceschini et al., "Frequency Modulated Continuous Wave Raido Altimeter Spectral Monitoring", "U.S. Appl. No. 14/972,880", filed Dec. 17, 2015, pp. 1-27, Published in: US.

Timm et al., "Systems and Methods to Syncronize Wireless Devices in the Presence of a FMCW Radio Altimeter", "U.S. Appl. No. 14/972,898, filed Dec. 17, 2015", Dec. 17, 2015, pp. 1-27, Published in: US.

Franceschini et al., "Cognitive Allocation of TDMA Resources in the Presence of a Radio Altimeter", "U.S. Appl. No. 14/972,925, filed Dec. 17, 2015", Dec. 17, 2015, pp. 1-30, Published in: US.

"Characteristics of WAIC systems and bandwidth requirements to support their safe operation", "Radiocommunication Study Groups", Dec. 2012, pp. 1-71, Publisher: International Telecommunication Union.

Bluemm et al., "Wireless Aircraft Cabin Communication—An ISM-Band Cognitive Radio Approach", "8th Karlsruhe Workshop on Software Radio", 2014, pp. 127-135.

"Technical characteristics and spectrum requirements of Wireless Avionics Intra-Communications systems to support their safe operation", "M Series Mobile, radiodeteremination, amateur and related satellite services", Dec. 2013, pp. 1-76, Publisher: International Telecommunication Union.

"Technical characteristics and operational objectives for wireless avionics intra-communications (WAIC)", "M Series Mobile, radiodetermination, amateur and related satellites services", Nov. 2010, pp. i-56, Publisher: International Telecommunication Union.

"Wireless Avionics Intra-Communications (WAIC) An Overview and Application Examples", 2011.

"WAIC Wireless Avionics Intra-Communications", Dec. 9, 2011, pp. 1-2, Publisher: Aerospace Vehicle Systems Institute.

Wattenhofer, "Clock Synchronization", "Ad Hoc and Sensor Networks", Nov. 16, 2009, pp. 1-11.

"Beacon frame", "downloaded from Wikipedia Jul. 20, 2015", Jul. 20, 2015, pp. 1-3.

"European Common Proposals for the Work of the Conference", "World Radiocommunication Conference (WRC-15) dowloaded from internet on Jul. 20, 2015",, pp. 1-3.

United States Patent and Trademark Office, "Notice of Allowability", "From U.S. Appl. No. 14/972,925", dated Nov. 14, 2017, pp. 1-6, Published in: US.

United States Patent and Trademark Office, "Final Office Action", "From U.S. Appl. No. 14/972,898", dated Oct. 19, 2017, pp. 1-59, Published in: US.

Lars Hanschke et al., "Radio Altimeter Interference Mitigation in Wireless Avionics Intra-Communicaiton Networks", 2017 15th Inter-

(56) References Cited

OTHER PUBLICATIONS national Symposium on Modeling and Optimization in Mobile, Ad Havoc, and Wireless Networks (WiOpt), XP33109143A, May 15, 2017, 8 pages.
Extended European Search Report dated Jul. 13, 2018 in European Application No. 18162144.2 (7 pages).

* cited by examiner

DELAY CALCULATION IN WIRELESS SYSTEMS

BACKGROUND

In a Time Division Multiple Access (TDMA) based wireless avionics system, a 4235-4400 MHz frequency spectrum may be shared by wireless avionics devices, and an aircraft's Frequency-Modulated Continuous Wave (FMCW) Radio Altimeter (RA). The radio altimeter transmits a radio frequency signal and looks for a corresponding return signal, continuously sweeping the signal frequency back and forth across the frequency spectrum in a see-saw pattern. For some wireless avionics devices, that same spectrum is used in a TDMA fashion divided into a fixed number of timeslots over a frame period. The frequency spectrum is divided into a number of channels, and timeslots for using those channels are allocated to wireless avionic devices in such a way as to allow them to communicate with the other nodes of the wireless avionic system and not interfere with the radio altimeter.

To implement such a TDMA scheme and avoid signal collisions, wireless avionic devices need to be synchronized within a required amount of accuracy to guarantee that transmissions from the wireless avionic devices will not interfere with each other or with the radio altimeter. A wireless avionics device in this scheme cannot transmit until it is synchronized with the other wireless avionics devices using this scheme.

In many conventional systems, wireless avionics devices are synchronized by updating their slot time with a computed delay based on a pre-computed correction factor. Further, in some conventional systems, the pre-computed correction factor is based on factory settings and stored in a memory in the wireless avionics device.

For the reasons stated above and for other reasons stated below which will become apparent to those skilled in the art upon reading and understanding the specification, there is a need in the art for alternate systems and methods to compute correction factor for unsynchronized wireless avionic devices in the presence of a FMCW radio altimeter.

SUMMARY

The embodiments of the present invention provide systems and methods for synchronizing a wireless device in a wireless device network. In one embodiment, the wireless device network comprises: at least one unsynchronized wireless device that shares a radio frequency spectrum in a time division multiple access based wireless system, and wherein the at least one unsynchronized wireless device includes a device processor; and a cognitive master in communication with the at least one unsynchronized wireless device wherein the cognitive master includes a cognitive master processor; wherein the cognitive master processor is configured to: determine a number of time slots required for the cognitive master to transmit a message to the at least one unsynchronized wireless device and to receive a response from the at least one unsynchronized wireless device, wherein each time slot is a portion of a radio frequency spectrum over a frame period; when the number of time slots required are consecutively available within the radio frequency spectrum, broadcast an announcement message indicating start of discovery of at least one unsynchronized wireless device; wherein the device processor is configured to: generate a response message, wherein the response message includes a device ID to identify the at least one unsynchronized wireless device; and broadcast the response message to the cognitive master; wherein the cognitive master processor is further configured to: generate a correction factor based on at least one of a cognitive master transmit time and a cognitive master received time, wherein the cognitive master transmit time is the time at which the cognitive master transmitted the announcement message, and wherein the cognitive master received time is the time at which the cognitive master received the response message; and broadcast the correction factor to the unsynchronized wireless device based on the device ID.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide systems and methods for computation of a correction factor applicable for synchronization of wireless devices in the presence of a radio frequency device, such as a FMCW radio altimeter. Specifically, embodiments of the present disclosure provide systems and methods for computing a correction factor applicable by an unsynchronized wireless device to achieve synchronization with the wireless system as a whole. The correction factor can be applied by the unsynchronized device when it receives an arbitrary timing synchronization beacon (ATSB) from the cognitive master.

In a TDMA system, all of the wireless devices have to maintain synchronization to transmit without interference from other device nodes so that each device in the wireless device network system remains in agreement as to the current timeslot and when the next timeslot begins. To do so, each device in the system is allocated a period of time (referred to as timeslot) for transmission within an available time frame. Each device needs to know when its allocated timeslot begins and ends within the frame so interference with other signals is avoided. The cognitive master of the wireless device network system sends an arbitrary timing synchronization beacon (ATSB) indicating the current time slot and the time at which the ATSB was transmitted.

However, there may be some delay before this beacon is received by the wireless device. Further, there may be additional delay by the wireless device in processing the beacon message and then transmitting a signal. The wireless device has to adjust the clock so that the transmitted message is within the allocated timeslot and does not collide with other transmitted signals. Accordingly, the wireless device can maintain synchronization by updating its timeslot counter with the value in the beacon message and its slot time with an offset correction value based on a slot time in the beacon message by the cognitive master and a correction factor.

The correction factor may be different for each device. The correction factor for a device is based on the time taken for the message to be received by that device, the time taken to process the message and respond to it, and the time taken for the response message to be received by the cognitive master.

Figure 1:
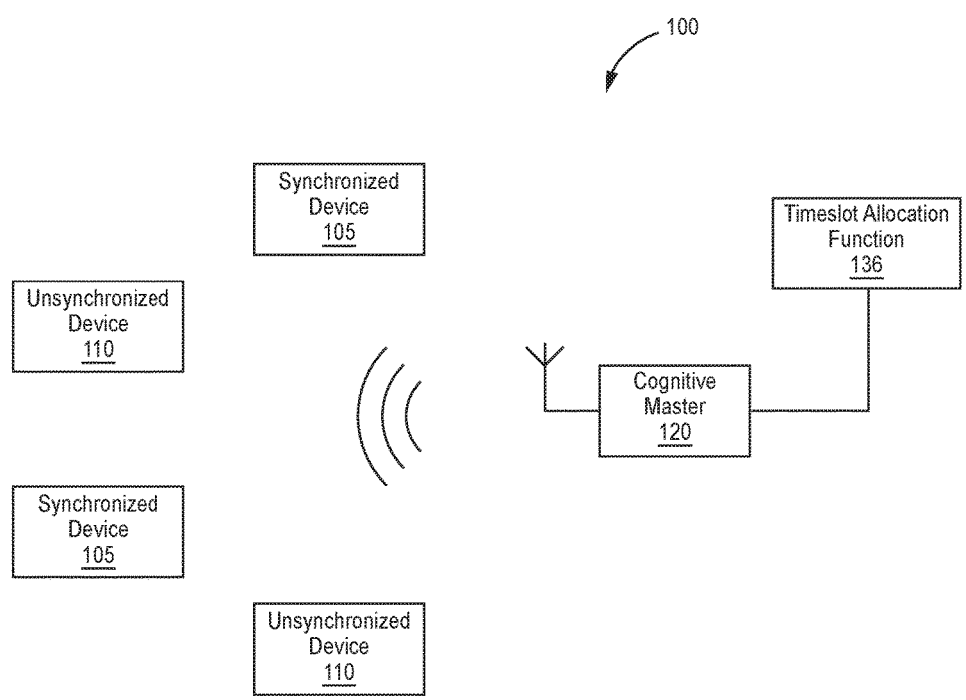
FIG. 1 is a diagram of a wireless device network of one embodiment of the present disclosure.

FIG. 1 is a block diagram illustrating a wireless device network 100 of one embodiment of the present disclosure. In some implementations, wireless device network may comprise a wireless avionics network. In further implementations, wireless avionics network may comprise a wireless avionics intra communication (WAIC) network. In the examples shown in FIGS. 1-4, wireless device network 100 comprises a wireless avionics network. However, in other implementations, wireless device network 100 can be implemented in other vehicle systems.

As shown in FIG. 1, wireless avionics network 100 comprises at least one unsynchronized wireless avionics device 110. In some embodiments, wireless avionics network 100 further comprises one or more synchronized wireless avionics device 105. Wireless avionics devices 105 and 110 share a radio frequency spectrum in a TDMA scheme where each wireless avionics device 105 or 110 is granted access to transmit over an RF channel during a specific timeslot allocated to it.

Wireless avionics network 100 further comprises a cognitive master 120 that is responsible for broadcasting allocated time slots to wireless avionics devices 105 and 110 during which the wireless avionics devices 105 and 110 are able to transmit. As described herein, timeslot timing of synchronized wireless avionics device 105 is already in sync with the wireless avionics network. That is, when cognitive master 120 broadcasts availability of a timeslot via a beacon message, synchronized wireless avionics device 105 is able to update its timeslot counter to agree with sync timeslot value in the beacon message, apply a correction factor to the sync time included in the beacon message and transmit without interfering with another signal.

In some embodiments, cognitive master 120 is coupled to a wireless avionics timeslot allocation function 136, which allocates timeslots for each of the wireless avionics devices 105 and 110 that do not conflict with another signal sweeping through the spectrum. In some embodiments, wireless avionics timeslot allocation function 136 is based on timeslots utilized by a radio altimeter (RA) signal. In such an embodiment, wireless avionics timeslot allocation function 136 uses data including the current amplitude and period of the RA signal pattern and the current frequency and/or channels occupied by the RA signal to identify timeslots in each of the multiple RF channels used by the wireless avionics system network 100 that do not conflict with the RA signal.

Figure 2:
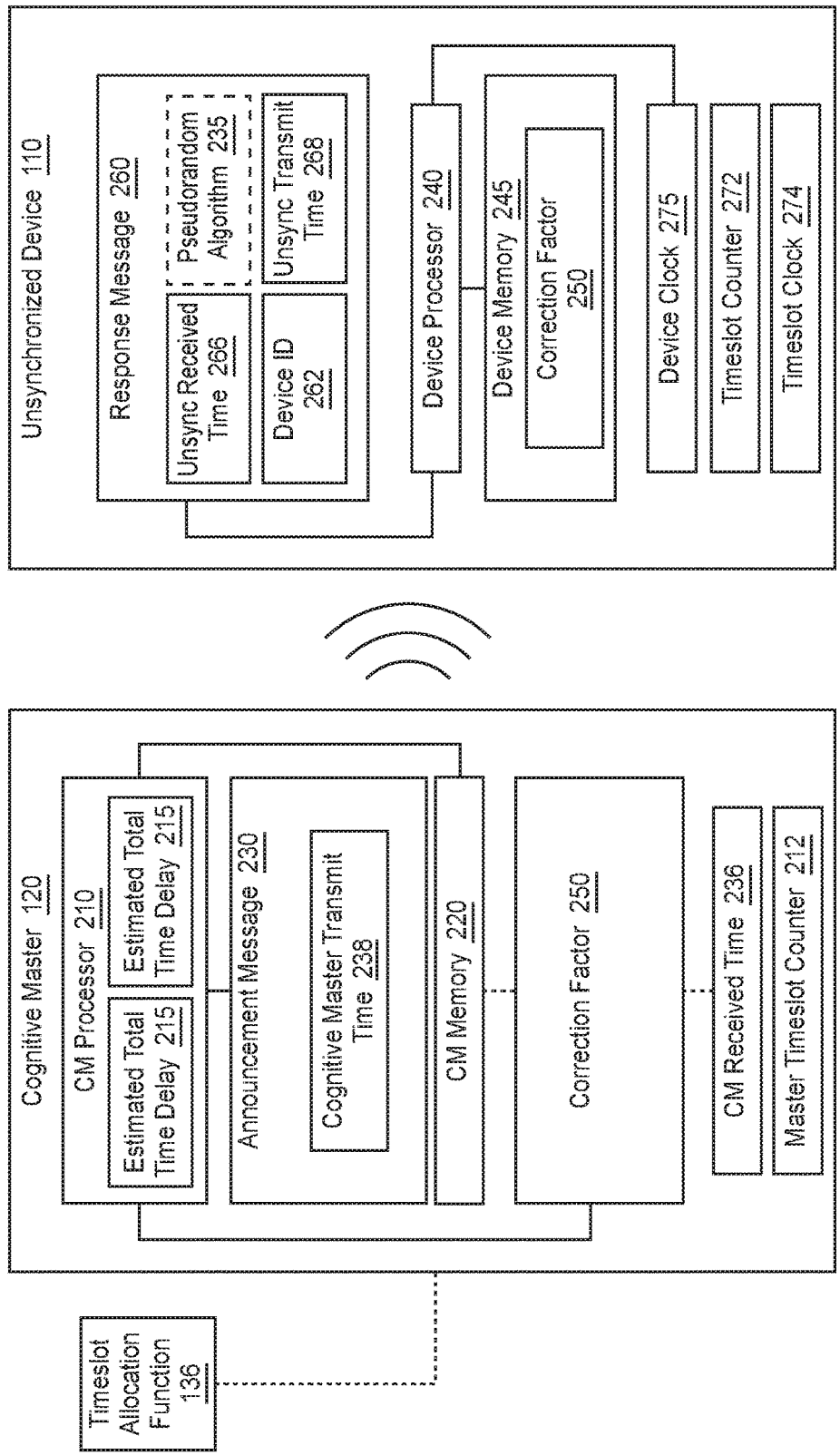
FIG. 2 is a diagram of a cognitive master of a wireless device network that is coupled with an unsynchronized device of the wireless device network according to one embodiment of the present disclosure.

At given time intervals, cognitive master 120 is configured to begin a search for unsynchronized wireless avionics devices 110. Cognitive master 120 comprises a cognitive master processor 210 and a cognitive master memory 220. (See FIG. 2). Cognitive master processor 210 is configured to estimate a total time delay 215 based on the time required for a message broadcast by the cognitive master 120 to be received by an unsynchronized device 110, the time required for the unsynchronized device 110 to process and respond, and the time required for the message transmitted by the unsynchronized device 110 to be received by the cognitive master processor 210. Cognitive master processor 210 is further configured to determine the total number of time slots required to perform the search for unsynchronized wireless avionics device(s) 110 based on the estimate of the total delay time without interfering with transmission from other devices or a radar altimeter signal. When the number of time slots required are consecutively available, cognitive master 120 broadcasts an announcement message 230 to search for unsynchronized wireless avionics devices 110 (See FIG. 2). As shown in FIG. 2, cognitive master 120 comprises a cognitive master processor 210 and a cognitive master memory 220. Cognitive master processor 210 generates an announcement message 230 including a time stamp 238 indicating the time at which cognitive master 120 begins transmission of announcement message 230.

Because the unsynchronized wireless avionics devices 110 are not synchronized with the wireless avionics network, the wireless avionics device 110 does not have a way of ensuring that it is not transmitting at the same time as another signal. Accordingly, cognitive master 120 broadcasts announcement message 230 only when it is able to allocate a window large enough with a plurality of consecutive timeslots for unsynchronized wireless avionics device 110 to respond back without interfering with a radio altimeter signal or signals from other devices.

Announcement message 230 further includes a time stamp 238 indicating the time at which announcement message 230 was transmitted by cognitive master 230. When unsynchronized wireless avionics device 110 receives announcement message 230, it determines the received time 266 indicating the time at which announcement message 230 was received by unsynchronized wireless avionics device 110.

Unsynchronized wireless avionics device 110 further includes a device processor 240. Device processor 240 generates a response message 260 to transmit back to cognitive master 120 in response to announcement message 230. Response message 260 includes device received time 266, device ID 262 and device transmit time 268. Device ID 262 identifies the unsynchronized wireless avionics device transmitting response message 260. Device transmit time 268 is the time at which unsynchronized wireless avionics device 110 transmits response message 260.

In exemplary embodiments, unsynchronized wireless avionics device 110 implements a pseudorandom delay algorithm 235 that delays sending a response. Running a pseudorandom delay algorithm 235 minimizes the probability that multiple unsynchronized devices will respond at the same time, causing their responses to be unusable. Accordingly, in some exemplary embodiments, unsynchronized device 110 includes a pseudorandom delay value generated by pseudorandom delay algorithm that is included with response message 260.

When response message 260 is received by cognitive master 120, cognitive master (CM) received time 236, the time at which response message 260 is received by cognitive master 120, is stored in cognitive master memory 220. Cognitive master processor 210 then computes correction factor 250 for unsynchronized wireless avionics device 110 having device ID 262. In exemplary embodiments, network 100 may include multiple unsynchronized devices 110. In these exemplary embodiments, cognitive master 120 can control the sequence in which each of the multiple unsynchronized devices 110 should respond based on device transmit time 268 and device received time 266.

In some embodiments, correction factor 250 is computed based on the total round trip delay (RTD). Total round trip delay is computed based on cognitive master transmit time 238 and cognitive master received time 236. That is, total round trip delay is the time elapsed from the time (cognitive master transmit time 238) that cognitive master 120 transmits the announcement message 230 to the time (cognitive master received time 236) that the cognitive master 120 receives a response message 260 from an unsynchronized device 110. In some implementations, the unsynchronized device 110 includes a timeslot counter 272 and slot time clock 274. Timeslot counter 272 indicates to the unsynchronized device 110 which of the one or more time slots within the wireless avionics system frame is the current time slot. Slot time clock 274 tracks the duration of each timeslot to keep track of the time at which each timeslot is supposed to start and end. When the correction factor is received by the unsynchronized device 110, the device processor 240 adds the sync time provided in a beacon with the correction factor 250 to produce an offset correction. The slot time clock 274 is then adjusted by the amount specified by the offset correction. For example, if the beacon message is broadcast by cognitive master 110 at the beginning of an available timeslot and the correction factor is 5 micro seconds, wireless avionics device 110 now knows that the available time slot began 5 micro seconds ago and can apply correction factor to set device clock 275 five micro seconds prior to its received time to remain in synchronization with time slot clock 214 of cognitive master 120.

Unsynchronized device 110 further includes a device memory 245. In some implementations, correction factor 250 can be stored in device memory 245. Unsynchronized device 110 can apply this correction factor 250 at a later time when it receives an ATSB message from cognitive master 120.

Figure 3:
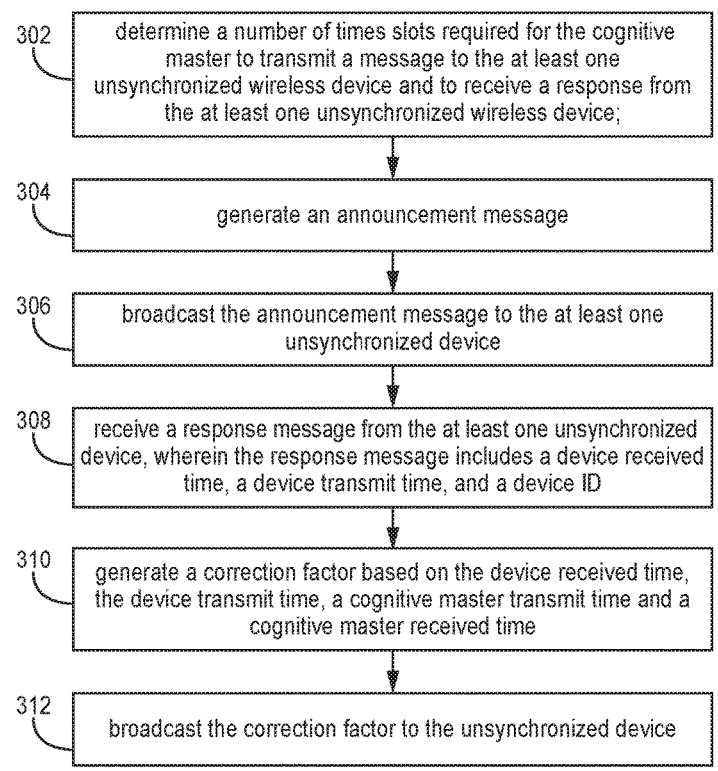
FIG. 3 is a flow chart illustrating a method of synchronization from the viewpoint of a cognitive master of the wireless device according to one embodiment of the present disclosure.

FIG. 3 is a flow chart illustrating a method 300 of one embodiment of the present disclosure. It should be understood that method 300 may be implemented using any of the embodiments described above in FIG. 1-2. Method 300 is performed from the perspective of a cognitive master, such as cognitive master 120.

Method 300 begins at block 302 with determining a number of time slots required for the cognitive master, such as cognitive master 120, to transmit a message to the at least one unsynchronized wireless avionics device, such as unsynchronized device 110, and to receive a response from the at least one unsynchronized wireless avionics device, wherein each of the number of time slots is a portion of a radio frequency spectrum over a frame period;

When the number of time slots required are consecutively available within the radio frequency spectrum, method 300 proceeds to block 304 with generating an announcement message, such as announcement message 230, to indicate the start of discovery process for at least one unsynchronized wireless avionics device, such as the unsynchronized wireless avionics device 110. In one implementation of this method, generating an announcement message further comprises receiving an allocation of a plurality of consecutive time slots within the radio frequency spectrum from a timeslot allocation function coupled to the cognitive master. In a further implementation of this method, receiving an allocation of a plurality of consecutive time slots within the radio frequency spectrum further comprises receiving identification of timeslots that will not conflict with a radio altimeter signal in a designated synchronization channel.

Method 300 then proceeds to block 306 with broadcasting the announcement message to the at least one unsynchronized wireless avionics device. In one implementation of the method, the announcement message includes the cognitive master transmit time, such as cognitive master transmit time 238.

Method 300 proceeds to block 308 with receiving a response message, such as response message 260, from the at least one unsynchronized wireless avionics device, wherein the response message includes at least a device ID, such as device ID 262, identifying the at least one unsynchronized wireless avionics device. In exemplary implementations of method 300, the response message include a device received time, such as received time 266, indicating the time at which the announcement message is received by the at least one unsynchronized wireless avionics device and a device transmit time, such as device transmit time 268, indicating the time at which the response message is transmitted by the at least one unsynchronized wireless avionics device.

Method 300 then proceeds to block 310 with generating a correction factor, such as correction factor 250, based on at least one of a cognitive master transmit time and/or a cognitive master received time, wherein the cognitive master transmit time is the time at which the cognitive master transmitted the announcement message, and wherein the cognitive master received time is the time at which the cognitive master received the response message. In one implementation of method 300, the correction factor is based on a total roundtrip delay, wherein the total roundtrip delay is the time elapsed between the cognitive master transmit time and the cognitive master received time. Finally, method 300 proceeds to block 312 with broadcasting the correction factor to the unsynchronized wireless avionics device based on the device ID. In one implementation, method 400 further comprises storing the correction factor in a cognitive master memory, such as memory 220. The stored correction factor can be accessed by the cognitive master at a later time for broadcasting.

Figure 4:
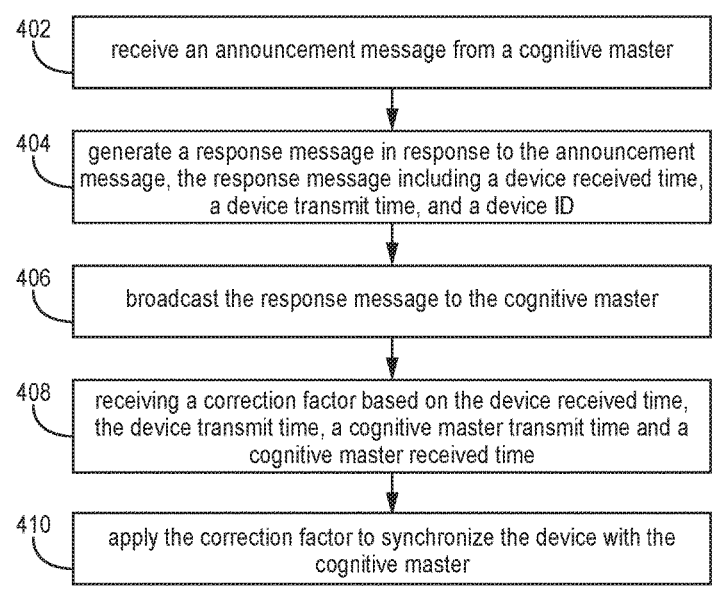
FIG. 4 is a flow chart illustrating a method of synchronization from the viewpoint of an unsynchronized device of the wireless device according to one embodiment of the present disclosure.

FIG. 4 is a flow chart illustrating a method 400 of one embodiment of the present disclosure. It should be understood that method 400 may be implemented using any of the embodiments described above in FIG. 1-2. Method 400 is performed from the perspective of a wireless avionics device, such as unsynchronized wireless avionics device 110.

Method 400 begins at block 402 with receiving an announcement message, such as announcement message 230, from a cognitive master indicating the start of discovery process for the device. Receiving of the announcement message indicates that a number of time slots are consecutively available within a radio frequency spectrum to respond to the announcement message. In one implementation of the method, the announcement message includes the cognitive master transmit time, such as cognitive master transmit time 238.

Method 400 then proceeds to block 404 with generating a response message, such as response message 260, in response to the announcement message, the response message including a device ID identifying the at least one unsynchronized wireless avionics device. In one exemplary embodiment, the response message includes a device received time indicating the time at which the announcement message is received by the at least one unsynchronized wireless avionics device and a device transmit time indicating the time at which the response message is transmitted by the at least one unsynchronized wireless avionics device.

Method 400 proceeds to block 406 with broadcasting the response message to the cognitive master. Method 400 then proceeds to block 408 with receiving a correction factor based on at least one of a cognitive master transmit time and a cognitive master received time, wherein the cognitive master transmit time is the time at which the cognitive master transmitted the announcement message, and wherein the cognitive master received time is the time at which the cognitive master received the response message. In one exemplary implementation of method 400, response message further includes a pseudorandom delay value generated by implementation of pseudorandom delay algorithm, such as pseudorandom delay algorithm 235.

In one implementation of, method 400 further comprises storing the correction factor in a memory, such as memory 245, the memory included in the unsynchronized wireless avionics device. Finally, method 400 proceeds to block 410 with applying the correction factor to synchronize the device with the cognitive master.

EXAMPLE EMBODIMENTS

Example 1 includes a wireless device network comprises: at least one unsynchronized wireless device that shares a radio frequency spectrum in a time division multiple access based wireless system, and wherein the at least one unsynchronized wireless device includes a device processor; and a cognitive master in communication with the at least one unsynchronized wireless device wherein the cognitive master includes a cognitive master processor; wherein the cognitive master processor is configured to: determine a number of time slots required for the cognitive master to transmit a message to the at least one unsynchronized wireless device and to receive a response from the at least one unsychronized wireless device, wherein each time slot is a portion of a radio frequency spectrum over a frame period; when the number of time slots required are consecutively available within the radio frequency spectrum, broadcast an announcement message indicating start of discovery of at least one unsynchronized wireless device; wherein the device processor is configured to: generate a response message, wherein the response message includes a device ID to identify the at least one unsynchronized wireless device; and broadcast the response message to the cognitive master; wherein the cognitive master processor is further configured to: generate a correction factor based on at least one of a cognitive master transmit time and a cognitive master received time, wherein the cognitive master transmit time is the time at which the cognitive master transmitted the announcement message, and wherein the cognitive master received time is the time at which the cognitive master received the response message; and broadcast the correction factor to the unsynchronized wireless device based on the device ID.

Example 2 includes the network of Example 1, wherein the response message includes a device received time indicating the time at which the announcement message is received by the at least one unsynchronized wireless device and a device transmit time indicating the time at which the response message is transmitted by the at least one unsynchronized wireless device.

Example 3 includes the network of any of Examples 1-2, wherein the correction factor is based on a total roundtrip delay, wherein the total roundtrip delay is the time elapsed between the cognitive master transmit time and the cognitive master received time.

Example 4 includes the network of any of Examples 1-3, wherein the announcement message includes the cognitive master transmit time.

Example 5 includes the network of any of Examples 1-4, wherein the cognitive master processor is configured to generate an announcement message when a timeslot allocation function coupled to the cognitive master allocates to the cognitive master a plurality of consecutive time slots within the radio frequency spectrum.

Example 6 includes the network of Example 5, wherein the timeslot allocation function identifies timeslots that will not conflict with a radio altimeter signal in a designated synchronization channel to allocate to the cognitive master a plurality of consecutive time slots within the radio frequency spectrum.

Example 7 includes the network of any of Examples 1-6, wherein the cognitive master comprises a memory to store the correction factor.

Example 8 includes the network of any of Examples 1-7, wherein the device processor is further configured to generate a pseudorandom delay value in response to the announcement message and the response message further includes the pseudorandom delay value indicating time by which the response message was pseudorandomly delayed.

Example 9 includes a method of synchronizing a device in a wireless system, the method comprising: determining a number of time slots required for the cognitive master to transmit a message to the at least one unsynchronized wireless device and to receive a response from the at least one unsynchronized wireless device, wherein each time slot is a portion of a radio frequency spectrum over a frame period; when the number of time slots required are consecutively available within the radio frequency spectrum, generating an announcement message to indicate the start of discovery process for at least one unsynchronized wireless device; broadcasting the announcement message to the at least one unsynchronized wireless device; receiving a response message from the at least one unsynchronized wireless device, wherein the response message includes at least a device ID identifying the at least one unsynchronized wireless device; generating a correction factor based on at least one of a cognitive master transmit time and a cognitive master received time, wherein the cognitive master transmit time is the time at which the cognitive master transmitted the announcement message, and wherein the cognitive master received time is the time at which the cognitive master received the response message; and broadcasting the correction factor to the unsynchronized wireless device based on the device ID.

Example 10 includes the method of Example 9, wherein the response message includes a device received time indicating the time at which the announcement message is received by the at least one unsynchronized wireless device and a device transmit time indicating the time at which the response message is transmitted by the at least one unsynchronized wireless device.

Example 11 includes the method of any of Examples 9-10, wherein the correction factor is based on a total roundtrip delay, wherein the total roundtrip delay is the time elapsed between the cognitive master transmit time and the cognitive master received time.

Example 12 includes the method of any of Examples 9-11, wherein the announcement message includes the cognitive master transmit time.

Example 13 includes the method of any of Examples 9-12, wherein generating an announcement message comprises: receiving an allocation of a plurality of consecutive time slots within the radio frequency spectrum from a timeslot allocation function coupled to the cognitive master.

Example 14 includes the method of Example 13, wherein receiving an allocation of a plurality of consecutive time slots within the radio frequency spectrum further comprises receiving identification of timeslots that will not conflict with a radio altimeter signal in a designated synchronization channel.

Example 15 includes the method of any of Examples 9-14, further comprising storing the correction factor in a cognitive master memory, wherein the cognitive master memory is a memory included in a cognitive master of the wireless system.

Example 16 includes a method of synchronizing a device in a wireless system, the method comprising: receiving an announcement message from a cognitive master indicating the start of discovery process for the device, wherein receiving the announcement message indicates that a number of time slots are consecutively available within a radio frequency spectrum to respond to the announcement message, wherein each time slot is a portion of a radio frequency spectrum over a frame period; generating a response message in response to the announcement message, the response message including a device ID identifying the at least one unsynchronized wireless device; broadcasting the response message to the cognitive master; receiving a correction factor based on at least one of a cognitive master transmit time and a cognitive master received time, wherein the cognitive master transmit time is the time at which the cognitive master transmitted the announcement message, and wherein the cognitive master received time is the time at which the cognitive master received the response message; applying the correction factor to synchronize the device with the cognitive master.

Example 17 includes the method of Example 16, wherein generating a response message in response to the announcement message further includes generating a pseudorandom delay value and including the pseudorandom delay value with the response message indicating time by which the response message was pseudorandomly delayed.

Example 18 includes the method of any of Examples 16-17, wherein the response message includes a device received time indicating the time at which the announcement message is received by the at least one unsynchronized wireless device and a device transmit time indicating the time at which the response message is transmitted by the at least one unsynchronized wireless device.

Example 19 includes the method of any of Examples 16-18, wherein the correction factor is based on a total roundtrip delay, wherein the total roundtrip delay is the time elapsed between the cognitive master transmit time and the cognitive master received time.

Example 20 includes the method of any of Examples 16-19 further comprises storing the correction factor in a memory, the memory included in the device.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A wireless device network comprises:
   at least one unsynchronized wireless device that shares a radio frequency spectrum in a time division multiple access based wireless system, and wherein the at least one unsynchronized wireless device includes a device processor; and
   a cognitive master in communication with the at least one unsynchronized wireless device wherein the cognitive master includes a cognitive master processor;
   wherein the cognitive master processor is configured to:
   determine a number of time slots required for the cognitive master to transmit a message to the at least one unsynchronized wireless device and to receive a response from the at least one unsynchronized wireless device, wherein each time slot is a portion of a radio frequency spectrum over a frame period;
   when the number of time slots required are consecutively available within the radio frequency spectrum, broadcast an announcement message indicating start of discovery of at least one unsynchronized wireless device;
   wherein the device processor is configured to:
   generate a response message, wherein the response message includes a device ID to identify the at least one unsynchronized wireless device; and
   broadcast the response message to the cognitive master;
   wherein the cognitive master processor is further configured to:
   generate a correction factor based on at least one of a cognitive master transmit time and a cognitive master received time, wherein the cognitive master transmit time is the time at which the cognitive master transmitted the announcement message, and wherein the cognitive master received time is the time at which the cognitive master received the response message; and
   broadcast the correction factor to the unsynchronized wireless device based on the device ID.

2. The network of claim 1, wherein the response message includes a device received time indicating the time at which the announcement message is received by the at least one unsynchronized wireless device and a device transmit time indicating the time at which the response message is transmitted by the at least one unsynchronized wireless device.

3. The network of claim 1, wherein the correction factor is based on a total roundtrip delay, wherein the total roundtrip delay is the time elapsed between the cognitive master transmit time and the cognitive master received time.

4. The network of claim 1, wherein the announcement message includes the cognitive master transmit time.

5. The network of claim 1, wherein the cognitive master processor is configured to generate an announcement message when a timeslot allocation function coupled to the cognitive master allocates to the cognitive master a plurality of consecutive time slots within the radio frequency spectrum.

6. The network of claim 5, wherein the timeslot allocation function identifies timeslots that will not conflict with a radio altimeter signal in a designated synchronization channel to allocate to the cognitive master a plurality of consecutive time slots within the radio frequency spectrum.

7. The network of claim 1, wherein the cognitive master comprises a memory to store the correction factor.

8. The network of claim 1, wherein the device processor is further configured to generate a pseudorandom delay value in response to the announcement message and the response message further includes the pseudorandom delay value indicating time by which the response message was pseudorandomly delayed.

9. A method of synchronizing a device in a wireless device system, the method comprising:
    determining a number of time slots required for the cognitive master to transmit a message to the at least one unsynchronized wireless device and to receive a response from the at least one unsynchronized wireless device, wherein each time slot is a portion of a radio frequency spectrum over a frame period;
    when the number of time slots required are consecutively available within the radio frequency spectrum, generating an announcement message to indicate the start of discovery process for at least one unsynchronized wireless device;
    broadcasting the announcement message to the at least one unsynchronized wireless device;
    receiving a response message from the at least one unsynchronized wireless device, wherein the response message includes at least a device ID identifying the at least one unsynchronized wireless device;
    generating a correction factor based on at least one of a cognitive master transmit time and a cognitive master received time, wherein the cognitive master transmit time is the time at which the cognitive master transmitted the announcement message, and wherein the cognitive master received time is the time at which the cognitive master received the response message; and
    broadcasting the correction factor to the unsynchronized wireless device based on the device ID.

10. The method of claim 9, wherein the response message includes a device received time indicating the time at which the announcement message is received by the at least one unsynchronized wireless device and a device transmit time indicating the time at which the response message is transmitted by the at least one unsynchronized wireless device.

11. The method of claim 9, wherein the correction factor is based on a total roundtrip delay, wherein the total roundtrip delay is the time elapsed between the cognitive master transmit time and the cognitive master received time.

12. The method of claim 9, wherein the announcement message includes the cognitive master transmit time.

13. The method of claim 9, wherein generating an announcement message comprises:
    receiving an allocation of a plurality of consecutive time slots within the radio frequency spectrum from a timeslot allocation function coupled to the cognitive master.

14. The method of claim 13, wherein receiving an allocation of a plurality of consecutive time slots within the radio frequency spectrum further comprises receiving identification of timeslots that will not conflict with a radio altimeter signal in a designated synchronization channel.

15. The method of claim 9, further comprising storing the correction factor in a cognitive master memory, wherein the cognitive master memory is a memory included in a cognitive master of the wireless device system.

16. A method of synchronizing a device in a wireless device system, the method comprising:
    receiving an announcement message from a cognitive master indicating the start of discovery process for the device, wherein receiving the announcement message indicates that a number of time slots are consecutively available within a radio frequency spectrum to respond to the announcement message, wherein each time slot is a portion of a radio frequency spectrum over a frame period;
    generating a response message in response to the announcement message, the response message including a device ID identifying the at least one unsynchronized wireless device;
    broadcasting the response message to the cognitive master;
    receiving a correction factor based on at least one of a cognitive master transmit time and a cognitive master received time, wherein the cognitive master transmit time is the time at which the cognitive master transmitted the announcement message, and wherein the cognitive master received time is the time at which the cognitive master received the response message; and
    applying the correction factor to synchronize the device with the cognitive master.

17. The method of claim 16, wherein generating a response message in response to the announcement message further includes generating a pseudorandom delay value and including the pseudorandom delay value with the response message indicating time by which the response message was pseudorandomly delayed.

18. The method of claim 16, wherein the response message includes a device received time indicating the time at which the announcement message is received by the at least one unsynchronized wireless device and a device transmit time indicating the time at which the response message is transmitted by the at least one unsynchronized wireless device.

19. The method of claim 16, wherein the correction factor is based on a total roundtrip delay, wherein the total roundtrip delay is the time elapsed between the cognitive master transmit time and the cognitive master received time.

20. The method of claim 16 further comprises storing the correction factor in a memory, the memory included in the device.

* * * * *